4 Sheets—Sheet 1.

R. T. SMITH.

PAPER PERFORATING MACHINE.

No. 10,311. Reissued Apr. 10, 1883.

Attest;
Walter Fowler,
Walter Allen

Inventor;
Roswell T. Smith,
by Chas. B. Tilden
Attorney

R. T. SMITH.

PAPER PERFORATING MACHINE.

No. 10,311. Reissued Apr. 10, 1883.

Attest;
Walter Fowler,
Walter Allen

Inventor;
Roswell T. Smith
by Chas. B. Tilden
Attorney.

R. T. SMITH.

4 Sheets—Sheet 3.

PAPER PERFORATING MACHINE.

No. 10,311.

Reissued Apr. 10, 1883.

Attest;

Walter Fowler

Walter Allen

Inventor;

Roswell T. Smith by

Chas. B. Tilden

Attorney.

4 Sheets—Sheet 4.

R. T. SMITH.

PAPER PERFORATING MACHINE.

No. 10,311. Reissued Apr. 10, 1883.

Attest;
J. Walter Fowler
Walter Allen

Inventor;
Roswell T. Smith
by Chas. B. Fiden
attorney

UNITED STATES PATENT OFFICE.

ROSWELL T. SMITH, OF NASHUA, NEW HAMPSHIRE.

PAPER-PERFORATING MACHINE.

SPECIFICATION forming part of Reissued Letters Patent No. 10,311, dated April 10, 1883.

Original No. 223,882, dated November 2, 1880. Application for reissue filed February 19, 1883.

*To all whom it may concern:*

Be it known that I, ROSWELL T. SMITH, a citizen of the United States, residing in Nashua, in the county of Hillsborough and State of New Hampshire, have invented certain new and useful Improvements in Machines for Perforating Paper for Automatic Organs, of which the following is a specification.

My invention relates to that class of perforating-machines for which Letters Patent of the United States were granted me upon the 27th day of January, A. D. 1880, No. 223,866; and it consists in certain improvements upon the mechanism therein shown and described.

Figure 1:
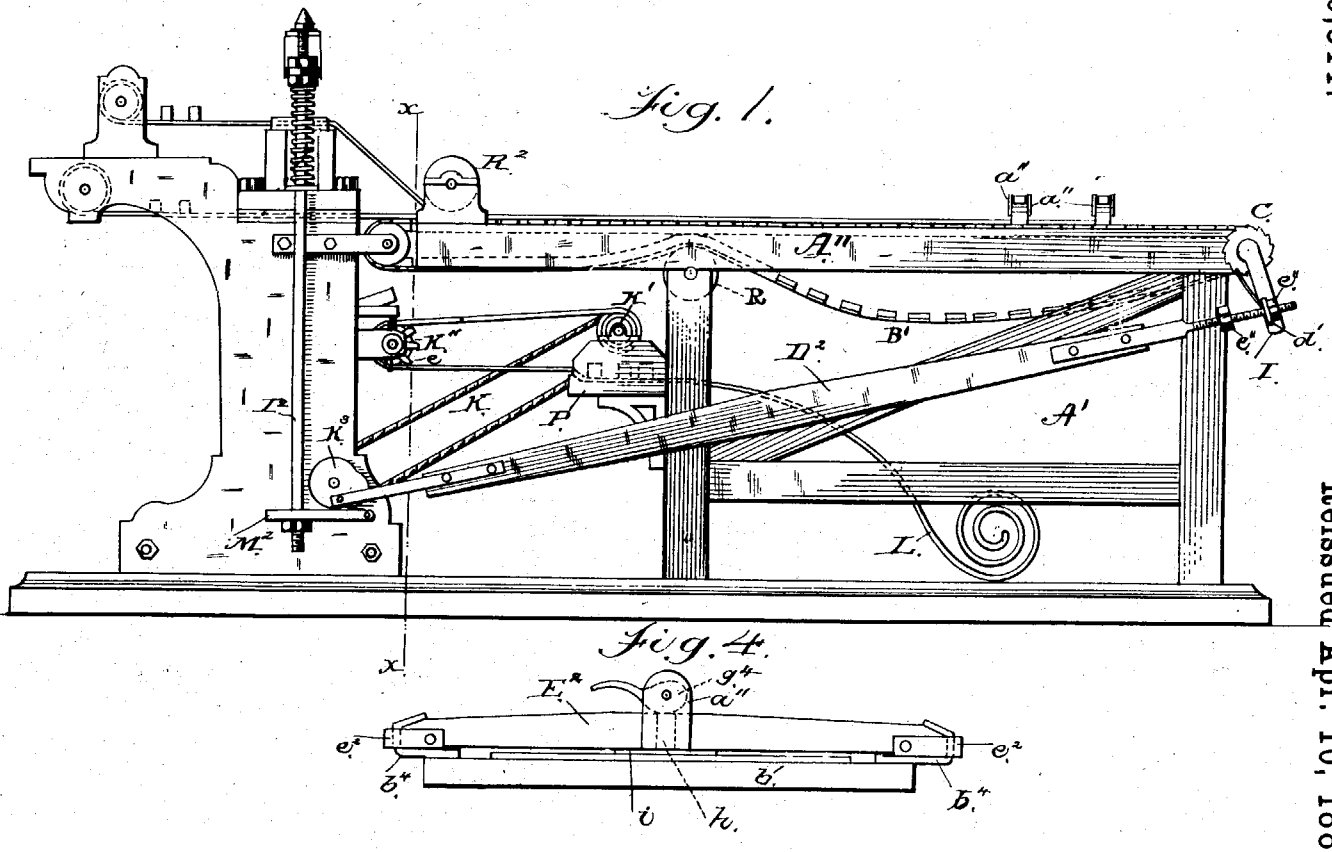
Figure 2:
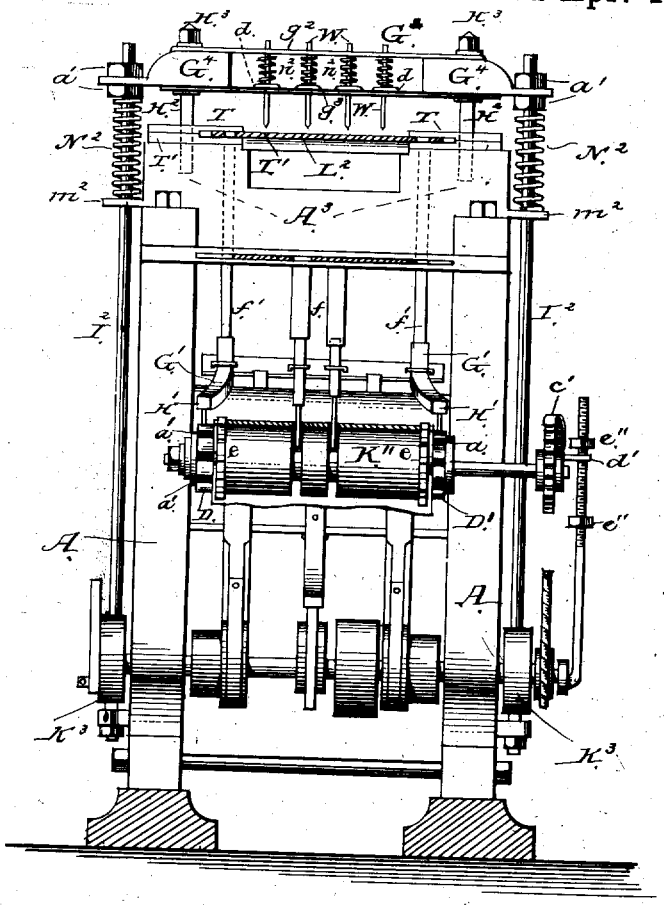
Figure 3:
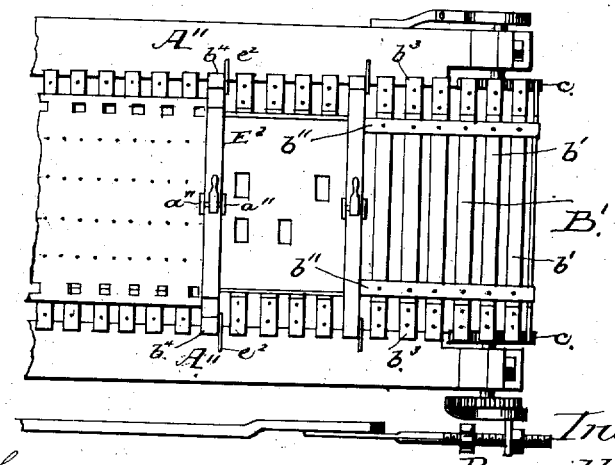
Figure 5:
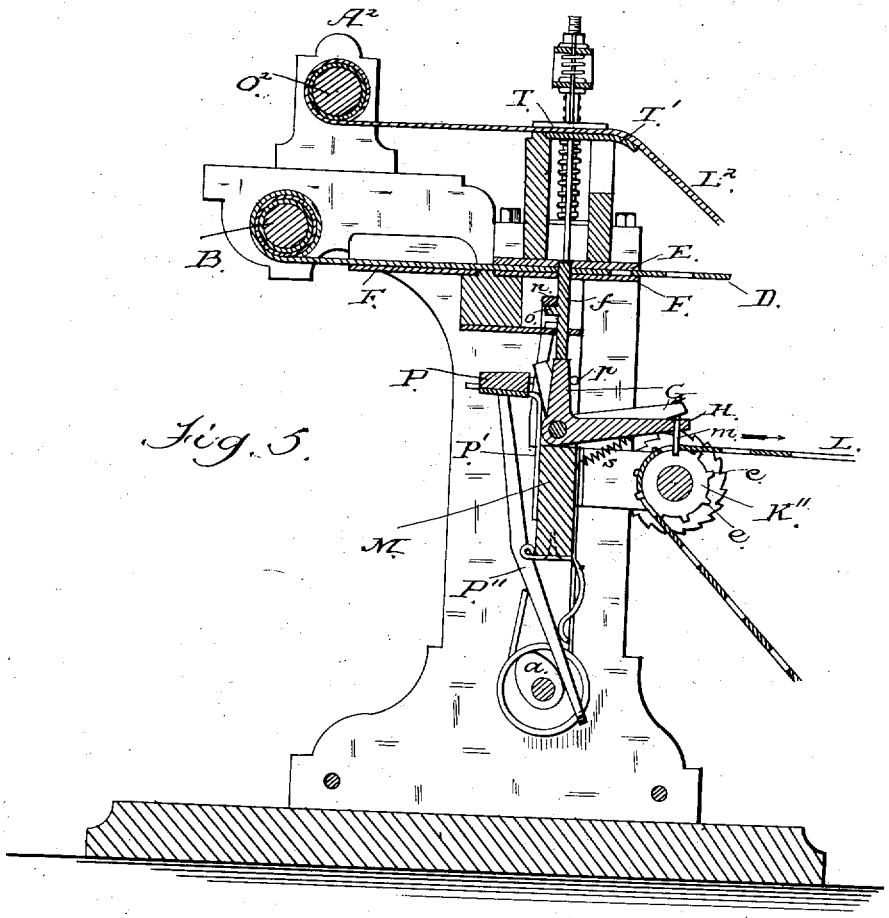
Figure 6:
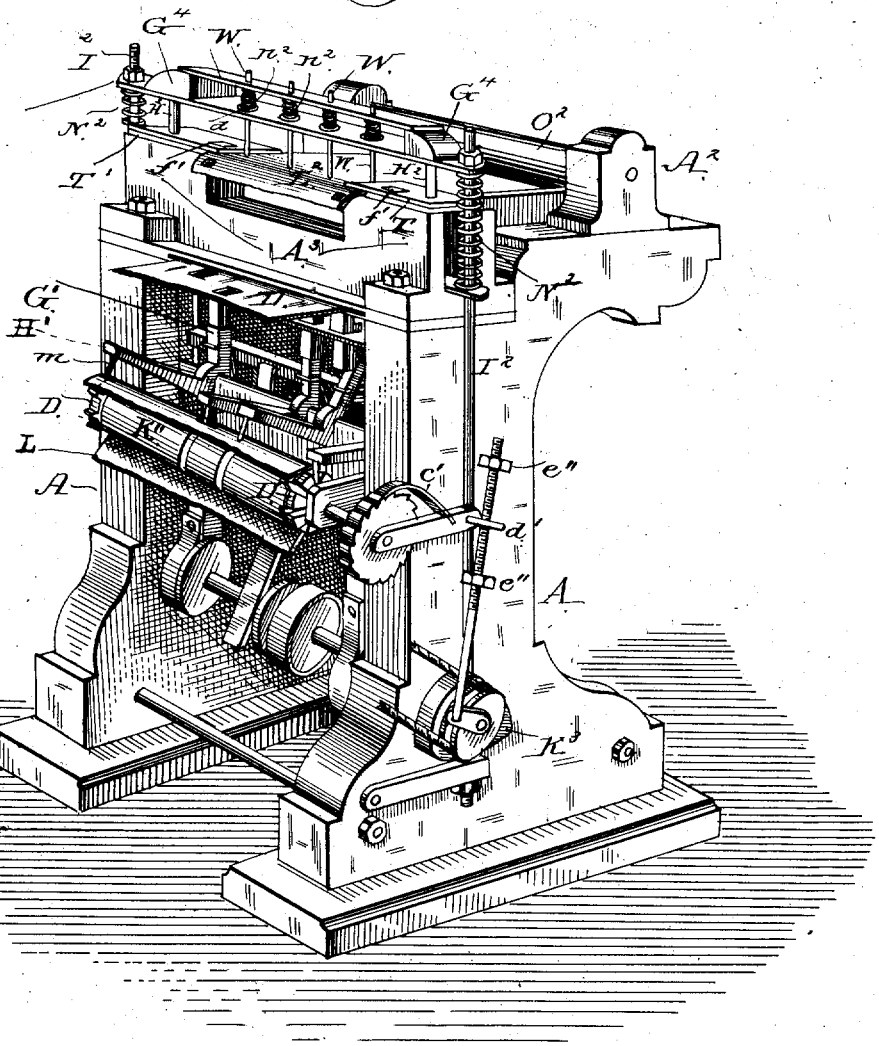

Referring to the drawings forming part of this application, Figure 1 is a side elevation. Fig. 2 is a vertical cross-section taken upon the line *x x*, Fig. 1. Fig. 3 is a plan showing a portion of the frame for supporting the feeding mechanism. Fig. 4 is a view upon an enlarged scale of the clamp-bar used in connection with the feeding apparatus. Fig. 5 is a section taken in a plane passing vertically through the perforating mechanism from front to rear at a point about midway between the standards. Fig. 6 is a perspective view, showing the perforating mechanism, the feeding apparatus not being shown.

In my patent of January 27, 1880, I have shown and described certain mechanism for feeding the paper sheets to the perforators. As therein shown, said mechanism consists substantially of two rolls, between which the paper passes, said rolls being tightly pressed together. By the friction or grip of these rolls upon the paper it is drawn step by step above the perforating-punches, the revolution of the rolls being effected by a pitman on the main shaft, by which a reciprocating motion is given to a pawl-carrier vibrating upon the shaft of one of the feed-rolls. A pawl mounted on this carrier engages with a ratchet rigidly mounted on the shaft of the roll, and the throw of this pawl is regulated by nuts, adjustable upon a threaded portion of the pitman, in the manner fully set forth in the specification of my said patent. I have stated in that specification that the utmost accuracy is necessary in the construction and combination of these parts, as it is absolutely essential to secure the highest degree of precision in the step-by-step movement or feed imparted to the paper sheet. This method of feeding by means of rolls is subject to some objection, especially when a number of sheets are fed and perforated at the same time. As the paper passes between the rolls, being in close contact with both throughout its entire width, it is evident that any inequality in the paper, or any misdirection or "skewing" of one or more of the sheets, will at once cause the paper to run toward one side, and this deviation, when once begun, is liable to continue and increase until the sheet is either torn by the side-thrust of the rolls, or until the latter are separated and the sheets brought into true position. This difficulty is caused by the constant grip of the rolls, which prevents the natural tendency of the paper to restore itself, under the action of the guides, to its proper position. Moreover, as said rolls act successively upon each part of the web, even a slight misdirection of one of the sheets is immediately taken up and will be perpetuated and increased. It will not infrequently happen, also, that when several sheets are being perforated simultaneously one will run out on one side and one upon the other, or even several upon each side, thereby ruining the paper, or a considerable quantity thereof, and causing great loss of time also.

In order, therefore, to obtain a more accurate feed of the paper and to avoid the objections mentioned, I have devised a new method of feeding the paper sheet or sheets, which consists in drawing the paper through the machine by means of clips or clamps, which are successively applied to the web or webs at a point near the machine, each new engagement being made before the preceding one is discontinued. These clips or clamps being applied to the paper at convenient intervals, and each clamp receding from the machine after it is applied, a free space is left between the point of attachment and the guides, thereby allowing sufficient lateral movement to permit the adjustment of each web by the action of the guides. Moreover, as the clips grasp the webs at a point near said guides where they are most likely to be in place, it is evident that, even if any displacement occurs, the successive engagement of the clamps will constantly tend to correct said displacement and restore the sheets to their proper position. To carry out this method I have devised a feeding apparatus consisting of a supporting device upon which the paper may rest, and to which the required step-motion is imparted, and detachable clamps adapted to engage successively and at proper intervals with the paper and draw it under the die-plate, each succeeding clamp being applied before the preceding one is removed. This method of feeding, together with the apparatus by which it is carried into effect, constitutes the first part of my invention.

In my said patent of January 27, 1880, I have also shown and described certain mechanism for imparting a feed movement to the stencil or pattern sheet. This, as shown, is accomplished by the revolution of the roll over which the stencil passes, and with which it engages by teeth or cogs placed at or near the ends of said roll, and entering perforations which are formed near each edge of the stencil-sheet. It is evident that great care must be taken in forming these perforations in order that each one shall accurately register with a corresponding tooth on the stencil-roll, as the least irregularity would either displace the stencil or allow it to slip on the roll, thereby causing a corresponding error in the arrangement of the perforations cut in the paper sheet. I have therefore invented and incorporated with the perforating mechanism devices for automatically cutting these perforations in a blank stencil-sheet, the arrangement being such that said sheet is fed to the punches, which perforate its edges, by the same mechanism which at the same time is feeding the paper to the perforators. The perforations in each edge of the stencil form a species of "rack," and they are cut by suitable punches arranged and operated in the manner hereinafter described. This rack-cutting mechanism forms the second part of my invention.

In the process of preparing a stencil-sheet it is necessary to divide its surface into equal parts or spaces before it passes into the hands of the composer, who lays off upon the surface the several sound-openings to be cut, designating their relative position and length by suitable marks upon the sheet, the perforations being afterward cut with a mallet and punch. To enable him to correctly arrange these openings with relation to each other, as well as to determine the length of each one, it has heretofore been customary to draw a series of transverse lines upon the surface of the sheet, separated by equal intervals, and exactly parallel with each other. This work requires the utmost care, since the harmony of the music and the entire execution depend upon the accuracy with which these sound-openings are arranged and cut. Heretofore this ruling of the stencil-sheet has been done by hand. It is found, however, that the constant repetition of the parallel lines has a tendency to confuse the eye of the operator, and even with the utmost care inaccuracies will frequently occur. Moreover, hand-labor of this kind is so slow and requires so much care and attention that it adds considerably to the cost of producing the music-paper. I have therefore invented and incorporated with the perforating and rack-cutting mechanism an apparatus for automatically marking the surface of the blank stencil-sheet with as many series of dots or points arranged transversely of the sheet as there are different series or rows of cuttings or sound-openings to be formed therein. This is accomplished by a number of pencils or marking-points, set in a reciprocating frame and brought after each feed movement into contact with the stencil. When finished the surface of the sheet will show a number of dots arranged exactly in parallel lines, both longitudinally and transversely, with equal intervals between. Each longitudinal row of these dots is located exactly in the line in which the openings are to be cut, and the interval between any two of the marked dots is equal to the space cut out by a single stroke of the perforating-punch, or, in other words, to the length of the shortest note or sound-opening used. This marking apparatus, which is combined with the rack-cutting mechanism, constitutes the third part of my invention.

In order to convey a clear idea of the improvements which form my present invention, and to aid in distinguishing them from the patent granted me January 27, 1880, I will briefly set forth the principal features of the machine shown and described in said patent, and will then point out more definitely the parts which belong to my present invention.

My said patent shows a machine for perforating music-paper, in which a series of independent punches, *f*, (see Fig. 5 of the accompanying drawings,) are used to cut the sheet D, which is fed between a die and a stripper-plate directly above the perforators. An automatic selection of these punches is effected by means of dogs G, controlled by a corresponding series of arms, H, having pins *m*, which engage with the stencil L as it passes over a grooved stencil-roll, K″, the dogs G being brought under and into engagement with their punches when the pins *m* drop through the perforations in the stencil, and, on the other hand, being held out of engagement with the punches as long as the pins *m* rest upon the unperforated portions of the stencil L. The dogs G are mounted upon a reciprocating carrier-frame, M, which is driven upward between the feed movements of the stencil and the paper sheet. By this upward movement all those dogs which are in engagement with any of the punches *f* operate said punches by driving them up through the paper, while the other punches not engaged by the dogs remain idle. After each stroke the dogs G are all withdrawn from beneath the punches, and the arms H raised by means of a yoke attached to a yoke-carrier, P, which is mounted by a spring, P′, upon the carrier-frame M. A pivoted lever, P″, actuated by a cam, *a*, on the main shaft, throws the yoke-carrier P backward as soon as the carrier-frame M descends, causing the yoke *p* to retract all the dogs G, thereby raising all the arms H and lifting the pins *m* clear of the stencil until the latter has been fed a single step forward. As soon as this feed movement is completed the cam *a* leaves the lever P″, and the spring P′ throws the yoke *p* forward, allowing the arms H to drop and bring their pins *m* into engagement with the stencil, thereby effecting a new selection of the perforators. The arms H are drawn downward by either spiral springs *s* beneath the said arms or by light leaf-springs secured to the carrier-frame M, and bearing against the rear edges of the pivoted dogs G. The punches *f* after each stroke are drawn downward by a yoke, *n*, which strikes upon a tooth, *o*, upon the back of each punch. This yoke *n* is attached to the carrier-frame, and the descent of said carrier after each stroke draws all the punches down, and clears them from the paper sheet in time to permit its being fed one step forward.

My said patent of January 27, 1880, also describes certain mechanism for imparting intermittent rotary motion to the stencil-roll and to the feed-rolls which move the paper; but this portion of said machine requires no mention, as it does not enter into my present invention.

I will first describe that portion of my invention by which the rack is cut in the stencil-sheet, together with the apparatus by which its surface is marked to prepare it for the composer.

Above the die and stripper plates E F, between which the paper sheets pass, I place a support for a second stripper-plate, T′, extending from side to side of the machine, and having two die-plates T—one on each side—as seen in Figs. 2 and 5. In the same line with the perforating-punches *f*, I place two rack-cutting punches, *f′ f′*—one at each end of the line of paper-perforators *f*. These rack-cutting punches are in all respects similar to the perforators *f*, except that they are longer and somewhat smaller, to correspond exactly with the size and shape of the teeth *e* upon the ends of the stencil-roll K″. Upon the back of each punch *f′* is formed a tooth similar to the tooth *o*, (seen in Fig. 5,) and adapted to engage with the yoke *n* in the same manner.

Upon each end of the carrier-frame M is mounted a dog, G′, directly beneath the rack-cutter *f′*. These dogs are similar to those which operate the perforators, and are provided with arms H′, the ends of which are slightly bent or curved outward, as seen in Fig. 2, their extremities being provided with pins similar to the pins *m* on the arms H. Upon each end of the stencil-roll K″ is a disk, D′, having notches or cavities *a′ a′* formed in its peripheries. These notches are located at equal distances from each other, and, as may be seen in Figs. 2 and 6, they are placed exactly opposite to the teeth *e* on the ends of the stencil-roll. By curving the arms H′ outward the pins upon their extremities are brought directly over the notched disks D′, and it is evident that as the stencil-roll K″ revolves these pins will fall at regular intervals into the notches in said disks, and will thereby cause the dogs G′ to engage with the rack-cutters *f′* and operate them.

The blank stencil-sheet $L^2$ is fed over the bed-plate T′, its two edges passing under the die-plates T T. It may be taken from a roll, $O^2$, mounted in standards $A^2$, which, for the sake of convenience, I place nearly over the roll B, from which the paper is taken. It will be noted by reference to Fig. 2 that the edges of the blank stencil-sheet pass beneath the die-plates T T, while nearly the entire surface of the sheet is exposed, for a purpose to be presently described. It will also be noted, by reference to the same figure, that the rack-cutting punches are in the same vertical plane with the teeth *e* on the ends of the stencil-roll.

The stripper and die plates T′ and T T rest upon solid supports $A^3$, bolted to the side standards, A, of the machine. A socket-bearing is formed in each of these supports to receive a pin, $H^2$, passing down through the die-plate T into the block upon which said plate is mounted, and adapted to move smoothly up and down in its socket. Upon these pins $H^2$ is mounted a horizontal bar or support, $G^2$, consisting of two metal plates, $g^2$ $g^3$, separated from each other by blocks $G^4$ $G^4$, inserted between the ends of the plates, and bolted in place by nuts $H^3$ $H^3$ upon the pins $H^2$. A series of perforations is formed in the plates $g^2$ $g^3$, and vertical wires or marking-pencils W are placed therein, supported at a suitable height by washers *d*, attached to each pencil, and resting upon the lower plate, $g^3$. Between these washers and the upper plate, $g^2$, are placed spiral springs, $n^2$, by which the pencils are held down, while at the same time they will yield to any upward force strong enough to compress the springs $n^2$.

The blocks $D^4$ are extended outward, and receive the ends of two vertically-reciprocating rods, $I^2$—one on each side of the machine—being attached by nuts *a′ a′*. A projecting plate, $m^2$, is attached to each side of the machine, at some distance below the support $G^2$, and between the blocks $D^4$ and said plates $m^2$ is placed a strong spiral spring, $N^2$, surrounding the rod $I^2$. These springs sustain the support $G^2$ at such a height that the pencils W are suspended with their points a short distance above the bed-plate T. The supporting-frame $G^2$ is reciprocated vertically by means of the rods or bars $I^2$, which are linked at their lower ends to a lever, $M^2$, having one of its ends pivoted to the machine. A cam, $K^3$, on the main shaft of the machine vibrates this lever, and at each revolution of the shaft this cam draws the rods downward, depressing the support $G^2$ far enough to bring the points of the pencils W into contact with the bed-plate T′, over which the blank stencil-sheet is fed. The springs $n^2$ yield sufficiently to bring every one of the pencils into perfect contact with the sheet.

I have already directed attention to the fact that the rack-cutting punches $f'$ are in the same vertical plane with the teeth $e$ upon the ends of the stencil-roll. It will also be noticed that the number of pencils W corresponds with the number of perforators $f$, and that each pencil marks in the exact line of cut of the corresponding punch below. (See Fig. 2.) It should be remarked that in the drawings I have illustrated two of the perforators only, although the number usually employed is from fourteen (14) to thirty-nine. (39.) Whatever the number may be, the marking-pencils W should correspond therewith.

I shall describe hereinafter the manner of feeding the blank stencil-sheet, whereby each feed movement is equal to the space or length of a single cut of the punch. It follows, therefore, that the blank stencil-sheet after passing through the machine will have its surface marked in the manner shown in Fig. 3 of the drawings, the longitudinal rows of dots being in the line of the cuttings to be made, while the distance between any two dots, measured lengthwise of the sheet, is equal to the length of a single cut of the perforator. It therefore indicates the length of the shortest sound-opening formed in the sheet. In other words, it represents a note of the lowest value as music is ordinarily written upon the staff. Prepared in this manner, the blank stencil-sheet is ready to be delivered to the composer, who lays off upon its surface any given musical composition. His markings are made in the different longitudinal lines of dots, substantially in the manner indicated by the markings represented in Fig. 3. The sheet is afterward perforated by a hand stamp or punch, the operator cutting out the spaces marked by the composer. When finished it is ready to be put upon the machine, as shown at L, Fig. 5, and from this stencil any number of music-sheets may be cut by the automatic mechanism already patented to me.

Wires, carbon pencils, or any other suitable marking device may be used for marking the blank stencil; but if wires are used sheets of impression-paper may be laid under them; but this may not be essential, as the sharpened points of the wires will indent the paper sufficiently to render their markings very distinct.

I may add that the marking of the stencil-sheet, as above described, may be effected in a machine having no especial devices for that purpose. By merely passing the sheet over the stencil-roll and operating the machine the pins $m$ on the arms H may be used as markers, or pencils may be placed on the said arms. The latter, being lifted by the yoke $p$ at every revolution of the shaft, and being lowered again after each feed movement of the stencil-roll, are evidently adapted to be used for marking in the manner described, although the process is longer. Moreover, the perforating mechanism cannot be used while the sheet is being marked in this manner, whereas in my present invention any number of blank stencil-sheets may be prepared without interrupting the action of the perforating mechanism in any manner.

I have already mentioned that in feeding the paper sheet or sheets I have found by experience that difficulty may be met with in using the feed-rolls shown in my patent, and in the opening portions of this specification I have named some of the objections to their use. For the purpose of avoiding these objections I have devised a new method of feeding the paper sheets, together with the apparatus hereinafter described for carrying it into effect. This method consists in holding the paper by means of clips or clamp-bars, which are adapted to engage with the paper sheets successively and at points having a suitable interval or space between, the arrangement being such that each clamp after performing its function is not released from engagement with the web until its successor has been brought into action. These clamps move step by step with the paper sheets and draw the latter through the machine. Moreover, each clamp engages with the paper at a point near to the machine and is released therefrom at a point more remote. The point of attachment being not far from the guides, it is clear that not only will the clamps grasp the paper when it is in a correct position, but if displacement should occur each engagement of the clamps subsequently will tend to restore the sheet or sheets to a true position, since the action of the guides which confine the edges of the several webs constantly tends to correct any deviation, and as the clamp recedes from the point where it was applied, the interval of unconfined web is sufficient to permit lateral movement enough to effect the said result. The most important feature of this method is the successive engagement of the clamps, whereby the several webs are grasped at separate points, each new engagement being made at a point where the several sheets are correctly aligned with each other under the action of the guides. As the paper is drawn through the machine, slight inequalities will not affect the feed, since the clamp steadily holds all the sheets in the position in which they were grasped when the clamp was applied. It should also be noted that, as one clamp is applied before the other is released, there is no interruption of the feed movement. To accomplish this method of feeding I have devised the following apparatus: In front of the machine I erect a frame, A′, extending any suitable distance, and firmly braced and supported, to prevent vibration. The upper part of this frame should be nearly upon a level with the stripper-plate E, so that the paper sheet may pass from the machine upon a horizontal plane, or nearly so. The top of the frame is composed of two parallel strips, A″, at each end of which is journaled a roll having its top in or about in the plane of the upper side of said strips A″. These strips are adapted to support an endless belt, B′, which is composed of separate slats of wood $b'$, (see Fig. 3,) riveted near each end to flexible or elastic strips of metal $b''$. The slats are placed close together, there being but a small space between, and each end of every slat is shod with a small rectangular plate of metal, $b^3$, which projects somewhat beyond the extremity of the slat. The length of the slats is somewhat greater than the width of the blank stencil-sheet, and the plates projecting from their ends rest upon the edges of the strips A″. At the extreme end of the frame is a roll having at its ends disks $c$ $c$, which are notched at intervals to receive the ends of the metal plates $b^3$. It is from this roll that the belt receives motion, and the notched disks $c$ $c$, by engaging with the slats of the belt, prevent the latter from slipping on the roll.

At frequent intervals upon the belt a slat is provided with elongated metal tips or plates, having the prolonged portion bent upward and then inward or toward each other. This construction, which is for a purpose shortly to be described, may be seen in Fig. 4, where one of the slats $b'$ is detached from the belt, the metal plates mentioned above being indicated by the reference-letter $b^4$.

To attach the paper sheet to the belt I use a clamp of peculiar form. It is composed of a bar of wood, $E^2$, a little larger than the slats $b'$, said bar having a small flat metal plate, $e^2$, fastened to and projecting outward from each end of the bar $E^2$, the plates being attached to one of the vertical sides of the bar, so that they stand in a vertical plane. At the center of the bar $E^2$ are placed two upright plates, $a''$ $a''$, between which is mounted a cam, $g^2$, bearing against a pin, $h$, placed loosely in a socket in the bar. While the upper end of this pin bears against the cam $g^4$, the lower end rests on a thin steel plate, $i$, fastened at one end by a screw, $m$, to the bar, and having the other end free.

In order to fasten the paper sheet or sheets D to the belt, they are laid upon the slats, and when in proper position the clamping-bar $E^2$ is placed upon them at a point where lies one of the slats having the prolonged and upwardly-bent plates $e^2$. The ends of the bar $E^2$ are inserted beneath the inwardly-bent ends of these plates until the metal pieces or plates $e^2$ come into contact with the plates $b^4$, care being taken to place the plates $e^2$ upon that side of the plates $b^4$ farthest from the machine, so that the pull of the sheets shall draw against the plates $b^4$. When the bar $E^2$ is in position the cam $g^2$ is turned down into the position shown in Fig. 4, whereby the steel plate $i$ is firmly clamped against the sheet, the upward pressure of the cam being resisted by the hooked ends of the plates $b^4$.

The slats of the belt may be made of a single piece of metal cast in the proper form, and connected by a chain, instead of an elastic band; or a heavy strip of cloth may be used, and the feed-rolls at the end of the frame may be covered with rubber; or, again, a large drum may be used, the paper being clamped to its periphery in the same manner in which it is fastened to the belt. The stencil-sheet blank may also be clamped to the belt in the same manner, and may be fed to the rack cutters and markers by the same apparatus. To accomplish this an idler-roll, $R^2$, is journaled in standards at the end of the frame nearest the machine, there being space between the roll and the belt to permit the passage beneath it of the blank stencil and one or more paper sheets. The edge of the bed-plate T′ is slightly curved, (see Fig. 5,) and the sheet is carried therefrom down to and under the roll $R^2$, and being laid upon the feeding-belt, on top of the paper sheets, it is fastened by a clamp in the manner already set forth. By this arrangement I secure a feed for the blank stencil-sheet which is exactly equal to the feed of the paper, and am able to prepare the stencil and cut the paper at the same time. The flexible belt passes over the rolls at the ends of the frame, and its weight is partly sustained beneath by a roll, R. To give motion to the belt I employ a pawl-and-ratchet feed similar to that shown in my patent of January 27, 1880, hereinbefore referred to. The pitman $D^2$, Fig. 1, passes from the main shaft of the machine to the distant end of the frame, where it engages with a pawl-carrier, I, mounted on the shaft of the roll, and having an eye, $d'$, through which the end of the pitman passes. Upon the end of the latter, which is screw-threaded for some distance, nuts $e''$ $e''$ are placed—one upon each side of the eye $d'$. By causing these nuts to approach or separate from each other the throw of the pawl $c'$ may be regulated and the feed movement correspondingly varied.

It may be desirable, owing to the weight and length of the pitman $D^2$, to attach to the frame A a support within which the end of the rod may play.

It is obvious that in using this feed an operator must attend the machine to affix and remove the clamps $E^2$, which must be released before they reach the roll C, a second clamp having been previously affixed at the end nearest the machine. In this way the paper sheets and the stencil may be allowed to run off the belt upon the floor, where they may be rolled up as the perforated strips increase in length.

In my present invention I feed the stencil in a manner different from that shown in my patent of January 27, 1880. Instead of taking it from a pay-off roll, I let the sheet lie loosely upon the floor in a roll, as shown at L, Fig. 1. Thence it passes over the stencil-roll K″ to the take-up roll K′. The stencil-roll is driven by a pawl-and-ratchet feed similar in all respects to that shown in my patent of January 27, 1880. The take-up roll K′ also is revolved by a belt, K, passing from a pulley on the main shaft to a pulley on the shaft of the roll.

These parts also need no description in this application. In passing to the stencil-roll K″ the stencil-sheet may run over a narrow table, P, Fig. 1, and by placing one or more light blocks of wood upon the sheet to create a little friction it may be drawn tightly down upon the roll K″.

Having thus described my invention, what I claim as new, and desire to secure by Letters Patent of the United States, is—

1. The method herein described of feeding one or more webs of paper to a perforating-machine, said method consisting in grasping the paper web or webs by clamps which are successively engaged therewith and drawn step by step through the machine, each succeeding clamp being brought into action before the preceding one is released, substantially as and for the purpose set forth.

2. The combination, in a perforating-machine, of a series of independent punches, a corresponding series of dogs adapted to engage with and to operate said punches, a pattern-sheet representing the relative length and arrangement of the sound-openings to be cut in the paper, and by which the automatic selection of the punches is effected, with a feeding apparatus having a step-by-step movement, the paper sheet or sheets being held by clamps, which are engaged successively therewith, each clamp being applied to the web or webs before its predecessor is released, whereby the paper is drawn under the die-plate, each feed movement being of such length that those punches having repeated action will cut an opening adapted to give a continuous sound, substantially as and for the purpose specified.

3. In a punching-machine, the combination, with the punches and their operating mechanism, of the stencil-sheet having openings of varied length and arrangement, and an endless belt to which the paper sheet or the stencil-sheet blank, or both, are clamped, and by which they are drawn step by step over the punches, substantially as and for the purpose set forth.

4. The combination, with the perforating mechanism, of an endless belt, the rolls at the ends of the supporting-frame A′, and the removable clamp-bars $E^2$, adapted to be engaged successively with the paper web or webs carried by said belt, in the manner and for the purpose set forth.

5. An endless feeding-belt for perforating-machines, composed of slats attached to flexible strips, and adapted to rest and slide upon the upper surface of the supporting-frame A′, in combination with a detachable clamping-bar resting upon said belt, and adapted to engage with its slats, substantially as and for the purpose set forth.

6. The combination, with the stencil-roll, of a notched disk, a dog mounted upon a reciprocating carrier above said disk, a cutter or punch placed above the dog, and a die and stripper plate between which the edge of the stencil-sheet passes, substantially as and for the purposes set forth.

7. The combination, with the punching mechanism, of a stencil-marking mechanism consisting of a series of marking points, wires, or pencils mounted on a reciprocating support, and adapted to be brought into contact with the stencil-sheet blank at regular intervals, substantially as and for the purpose set forth.

8. The combination, with the punching and marking apparatus, of a rack-cutting mechanism consisting of a punch or punches arranged to cut the stencil-sheet blank, said punches being controlled by corresponding dogs, which are mounted on a reciprocating carrier, and caused to engage with the rack-cutters by means of a notched disk on the stencil-roll, substantially as and for the purpose set forth.

9. The combination, with the perforating mechanism, the rack-cutting apparatus, and the marking devices, of a feeding mechanism consisting of a flexible belt passing over a suitable supporting-frame in front of the machine, adapted to feed, either separately or simultaneously, both the paper sheet or sheets and the stencil-sheet blank, the one to the perforators and the other to the marking and rack-cutting devices, substantially as and for the purpose set forth.

10. The combination, with the stencil-marking and rack-cutting mechanism, of the flexible feeding-belt and a roll mounted above it, the lower side of said roll being near the surface of the belt, and said roll being placed at the end of the frame nearest said marking and cutting mechanism, substantially as and for the purpose specified.

11. A clamping-bar adapted to engage with the feeding-belt and attach the paper and stencil-sheet blank thereto, said bar consisting of a block having flat vertical projections at its ends, with a cam and pin, *h*, in the center, and a flat steel plate, *i*, upon the lower side, substantially as and for the purpose set forth.

12. A flexible feeding-belt consisting of slats connected by elastic or flexible strips, said slats being shod at their ends with projecting metal plates, certain slats in said belt being provided with plates which are prolonged and bent upward and inward to furnish a fastening for the clamp-bar, substantially as set forth.

13. The combination of the frame A′A″, the flexible belt constructed as described, the roll journaled in standards at the end of the frame and above the belt, the clamp-bar, the pitman for driving said belt, the independent punches, the series of selecting and operating dogs, and the marking wires or pencils, substantially as set forth.

14. The combination, with the marking mechanism, of the carrier M, the dogs G′, having curved or outwardly-deflected arms H′, the disks D′, having notches *a a*, &c., and the stencil-roll, all substantially as and for the purpose set forth.

15. In a paper-perforating machine, the combination, with the independent dogs and punches, the carrier-frame on which said dogs are mounted, and the stencil-roll having notched disks mounted thereon, of the rack-cutting punches, and a series of pencils or wires adapted to be reciprocated against a bed-plate over which the stencil-sheet blank is fed, substantially as and for the purpose specified.

16. The combination, with the stencil-roll having teeth or cogs *e e*, of a single take-up roll, a friction-table over which the stencil passes before reaching the roll, and devices for feeding both the stencil and the take-up roll, substantially as and for the purposes set forth.

17. The combination, with the supporting-bar $G^2$, of the marking-wires W, mounted movably in said bar, the springs $n^2$, and mechanism for reciprocating said bar, substantially as and for the purpose set forth.

18. The combination, with the marking wires or pencils W, of the bed-plate T′, the die-plates upon each side thereof, the rack-cutters *f*′, the dogs G′, having bent arms H, provided with pins, and the stencil-roll K″, provided with notched disks, all substantially as and for the purpose set forth.

In testimony whereof I have hereunto signed my name in the presence of two subscribing witnesses.

ROSWELL T. SMITH.

Witnesses:
CHAS. B. TILDEN,
NETTA WHEELER.